United States Patent Office 2,977,349
Patented Mar. 28, 1961

2,977,349

PROCESS FOR POLYMERIZING DIENES

Charles E. Brockway, Akron, and Albert F. Ekar, Cleveland, Ohio, assignors to Goodrich-Gulf Chemicals, Inc., Cleveland, Ohio, a corporation of Delaware No Drawing. Filed Nov. 7, 1956, Ser. No. 620,810

4 Claims. (Cl. 260—94.3)

The present invention relates generally to the polymerization of diene hydrocarbons. More specifically, the invention relates to an improved method wherein the course of the polymerization can be modified so as to produce polymers of increased molecular weight and/or reduced gel content.

Butadiene and isoprene have been polymerized in hydrocarbon solution in the presence of precipitate-containing heavy metal/organometallic catalysts with the production of homopolymers of great regularity of structure wherein the monomer units are united in an all-1,4 structure. In the copending application of Samuel E. Horne, Jr., Serial No. 472,786, filed December 2, 1954, there is disclosed the preparation of an all-cis 1,4 polyisoprene by such a process. In the copending application of Carlin F. Gibbs, Serial No. 503,027, there is disclosed the production of many polymers of this type, including specifically an all-trans 1,4 polyisoprene. In the copending application of Earl J. Carlson, Serial No. 503,028, filed April 21, 1955, there is disclosed the preparation of all-1,4 polybutadienes, including specifically an all-trans 1,4 polybutadiene.

In the above-described processes control of the polymerization can be effected to some degree by varying temperature, catalyst concentration and the catalyst molar ratio heavy metal/organometallic compound, and monomer/solvent ratio. Such control is not sufficient or practical in all cases for commercial scale operations. For example, while the molecular weight of the polymers are comparable to those of other known synthetic rubbers, it is desirable in many cases to produce polymers of considerably higher molecular and/or lower gel content. With only the above-mentioned control factors available, abnormally low reaction temperatures, high catalyst levels, and exceptional solvent and monomer purity are required for a noticeably increased molecular weight. Likewise, the polymers generally contain a certain amount of gel which, it appears, may be bad for stress crack and cut growth. It would be highly advantageous to be able to modify the course of the polymerization by the simple expedient of adding a substance to the reaction mixture (as is done in aqueous emulsion, free radical catalyzed polymerization processes).

In accordance with this invention there is provided a method of carrying out the polymerization of conjugated polyolefin hydrocarbons, as defined below, in the presence of (1) a heavy metal/organometallic catalyst and (2) a soluble organo-silicon compound containing silicon-oxygen bonds. It has been found that very small amounts of silicone oils or greases, silicate esters and various hydrolyzed silane derivatives have the ability to modify the course of the polymerization reaction producing polymers of substantially increased molecular weights, reduced gel contents, and the like. In addition, reaction rates are more moderate in the presence of the organo-silicon modifier.

The catalysts which have been found to respond to the modifying action of the organo-silicon modifiers are the precipitate-containing catalysts produced by the interaction of (1) an organo-metallic compound (or compound containing at least one metal-carbon bond) with (2) a compound of a "heavy metal" of the 4th to the 10th positions of the periodic chart in which the elements are arranged in short and long periods and in which the alkali metals occupy the first position (see the Periodic Chart of the Elements, on pages 342–343 of the 33rd Edition of the Handbook of Chemistry and Physics, published 1951 by the Chemical Rubber Publishing Co., Cleveland, Ohio). Such metals are those of periodic groups IVB, VB, VIB VIIB, and VIII including titanium, zirconium, hafnium, vanadium, niobium (columbium), tantalum, chromium, molybdenum, tungsten, manganese, masurium, rhenium, iron, ruthenium, osmium, cobalt, rhodium, iridium, nickel, palladium, and platinum, as well as metals in corresponding positions in the last long period in the so-called "actinium series" such as thorium and uranium. While any compound of these metals, whether soluble or insoluble, can be employed, it is preferred to employ those that are anhydrous salts of the formula $M(A)_n$, wherein M is the heavy metal atom, A is a monovalent anion (preferably non-oxidizing in character) and $n$ is one of the higher valence states of the metal, preferably the highest. Especially preferred are the anhydrous halides (chlorides, bromides, iodides and fluorides) of these metals. The tetrachloride of titanium is preferred for the preparation of all-cis 1,4 and all-trans 1,4 polyisoprenes; the tetrachloride of vanadium and the dichloride of nickel are preferred for all-trans 1,4 polybutadiene and for all-trans 1,4 polyisoprene; and the dichloride of cobalt for all-cis 1,4 polybutadiene. Other useful heavy metal salts include the inorganic salts such as the oxy-halides and sulfates and other organic salts such as acetates, acetylacetonates and oxalates of the heavy metals of the above-defined groups.

As pointed out above, the heavy metal compounds are converted into active, directive catalysts by interaction with a correct proportion of an organo-metallic compound containing at least one carbon-to-metal linkage, that is, a metal atom attached to an organic group through a carbon-to-metal linkage. Such organo-metallic compounds include alkali-metal hydrocarbyls; alkaline-earth hydrocarbyls; similar compounds of magnesium and zinc; aluminum hydrocarbyls; and complexes of one or more of these and/or with still other metals. The term "hydrocarbyl" is employed herein to mean any compound wherein a hydrocarbon radical (hence the term "hydrocarbyl"), including aliphatic, cycloaliphatic and aromatic hydrocarbon radicals, is attached to a metal through a carbon atom. Thus, there may be utilized sodium, potassium, and lithium alkyls, magnesium alkyls, zinc alkyls, lead alkyls, tin alkyls, aluminum alkyls, aluminum aryls, aluminum aralkyls, aluminum alkaryls, complexes such as sodium aluminum tetrabutyl, and many others.

Greatly preferred are the organo-aluminum compounds (aluminum hydrocarbyls) of the structure

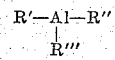

wherein R' is a hydrocarbon radical, R" is another R' group, an —OR— group, a hydrogen atom or a halogen atom, and R'" is another R' or hydrogen. Particularly preferred are the aluminum tri-(alkyl) hydrocarbyls such as triethyl aluminum, tripropyl aluminum, tri-n-butyl aluminum, triisobutyl aluminum, trioctyl aluminum, and the like.

The catalyst-forming reaction between the heavy metal compound and the organo-metalic compound is carried out in a closed vessel under an inert atmosphere, and preferably in an inert diluent medium, with care being exercised to exclude air, water, alcohols, organic acids, amines, and any other substance containing active hydrogen or otherwise capable of preferential reaction with the organo-metallic portion of the catalyst or with any of the organo-metallic catalyst-forming ingredients. Reaction usually is accompanied by a change in color and/or the formation of a precipitate. The temperature of reaction is not critical up to 80 to 100° C. (where some organo-metallic compounds may decompose), although with the more insoluble, less reactive heavy metal compounds it is sometimes advantageous to heat the reaction medium to speed an otherwise slow reaction. With the more active alkyl aluminum compounds and solvent-soluble heavy metal compounds such as $TiCl_4$, the reactions are vigorous at room temperature (and slightly exothermic). The latter catalysts can be utilized without aging while the slower reacting catalysts can be improved and rendered more predictable by aging for a time before being brought into contact with the monomer. In many cases it is advantageous to minimize the effects of oxygen and water, etc. by adding a sufficient proportion of the organo-metallic compound to a small portion of the solvent (to scavenge impurities), then add the heavy metal compound to form the catalyst, and finally dilute the already-formed catalyst to the desired final concentration before or after adding the monomer. Catalyst aging and mixing while in concentrated form aid in achieving a stable equilibrium condition in the catalyst, thereby rendering the action of the catalyst more predictable.

The organo-silicon modifier preferably is present during the catalyst-forming reaction in order to secure maximum modifier action. The presence of the organo-silicon derivative does not interfere with the catalyst-forming reaction and, as far as is known, does not participate therein. However, when present it can be envisioned that the modifier is adsorbed on the surface of the freshly-formed catalyst precipitate and thereby is rendered more effective. However, any order of mixing can be employed.

The proportion of organo-silicon modifier may be varied somewhat but, in general, only very small proportions are required. At least about 0.1 percent by weight based on the weight of monomers should be utilized to secure a significant modifying effect. As the proportion of modifier is increased, the modifying action also increases, up to a concentration of about 0.2 to 0.3 percent. Beyond the latter value little additional modifying action is obtained. Beyond about 0.5 percent retardation of the polymerization reaction may be too severe to obtain good reactions in a practical time. In some cases an increase in total catalyst concentration can be employed to improve reaction rate without serious interference with the action of the modifier. However, it is generally preferred to employ as small a proportion of modifier as is consistent with a good balance of high reaction rates, good conversion and the desired increase in molecular weight, reduction in gel content, etc.

It is generally desirable to carry out both the catalyst-forming reaction and the subsequent polymerization reaction in an inert diluent media such as any of the aliphatic, cycloaliphatic and aromatic hydrocarbons including the saturated alkanes such as butane, hexane, pentane, heptane, cetane, or the like or mixtures thereof such as "Deobase" kerosine, diesel oil, or the mixture of alkanes obtained from the Fischer-Tropsch process: or a cycloalkane such as cyclohexane or methyl cyclohexane; or a benzene hydrocarbon such as benzene, toluene or xylene. In some cases unsaturated hydrocarbons can be used as diluents where such do not readily form copolymers with the diene polymerized. It is important that the inert hydrocarbon diluent be as low as possible in free water and oxygen. Flash distillation followed by storage over a drying agent such as $CaH_2$, BaO, "molecular sieves," sodium hydride, metallic sodium, etc. will reduce the water content to a very low figure of 10 or 15 p.p.m. or less. Treatment with powerful drying agents such as metallic sodium in dispersed form, "molecular sieves" etc. followed by flash-distilling also is effective in removing water and oxygen. It sometimes is helpful to add the solvent to the reactor and then distill a portion of the solvent to remove excess water.

In general, the polymerization process of this invention is also sensitive to monomer impurities. For example, commercial isoprene contains cyclopentadiene and acetylenic hydrocarbons which are powerful retarders. Treatment with sodium, maleic anhydride, "molecular sieves," or careful azeotropic distillation with pentane is helpful in reducing the proportion of these inhibitory or retarding substances. Commercial butadiene, on the other hand, seems to be free of such substances and seems to require only flash-distillation to remove the monomer inhibitor, if any, peroxides, or excess water and oxygen.

The proportion, or ratio, of heavy metal to organo-metallic compound employed to produce the catalyst can be varied considerably with the obtaining of changes in polymerization reaction rate, conversion and, in certain cases, changes in polymer structure. For example, with the $TiCl_4$/triisobutyl aluminum system, all-trans 1,4 polyisoprenes are obtained in range of Ti/Al (molar ratio) of from about 1.5:1 to about 3:1, most preferred being about 2:1. All-cis 1,4-polyisoprenes are obtained in the range from about 0.5:1 to 1.5:1, most preferably about 1:1. When working with butadiene as the monomer, the Ti/Al molar ratio of between about 1.5:1 and about 3:1 will produce an all-trans 1,4 polybutadiene. With a Ti/Al ratio of 3:1 and heating the catalyst at about 50–100° C. for several hours an essentially all-cis 1,4 polybutadiene can be obtained.

With the catalyst combination $CoCl_2$/triisobutyl aluminum, an all-cis 1,4 polybutadiene is obtained with catalysts in which the Co/Al molar ratio is between about 25:1 to about 1:25, although better yields are obtained in the range between about 25:1 and about 1:1 (best 5:1). All-trans 1,4 polybutadienes are obtained with a $VCl_4$/triisobutyl aluminum molar ratio of between about 1:1 to 1:20. In the system $NiCl_2$/triisobutyl aluminum all-trans 1,4 polybutadienes are obtained at Ni/Al ratios of between about 10:1 to about 1:10. With other heavy metal compounds and/or other organo-metallic compounds, the ratio heavy metal/organometallic compound usually will have to be adjusted to bring about the proper reduction of the heavy metal in order to secure a catalyst capable of the desired form of directive activity. The organo-silicon modifier has no effect on the directive activity of any of these heavy metal/organo-metallic catalysts.

The total concentration (i.e. total of both ingredients) of catalyst can be varied widely depending on, to a considerable extent, the solvent and monomer purity. With these catalysts, the total concentration may vary from as little as about 0.25 to 0.5 percent to as high as 20 percent or more, although from about 1 to about 7 percent will usually suffice. In terms of molar quantities, from about 3 or 5 to 100 millimoles per liter of total catalyst will usually suffice.

After the catalyst has been prepared, the monomer is added (although any order of mixing can be employed and the monomer can be present during the catalyst preparation step) and the resulting mixture heated or cooled, as may be required, to control the polymerization reaction rate at a reasonable value. Agitation should ordinarily be employed for good heat transfer in order to assist in reaction control. With the organo-silicon modifiers of this invention, the use of reaction temperatures in excess of about 35° C. is not desirable since higher temperatures seem to reduce the modifying effects of the modifier. It is preferred to control the polymerization temperature at a value below about 25° C. Very low temperatures can be employed, but since one of the values of this invention is to secure higher molecular weights without resorting to low temperatures, it is preferred to operate in the range from about −5 to about 25° C.

Under the above conditions the reaction is usually complete in less than 48 hours and reaction times of a matter of minutes or an hour or two can be obtained, if desired. Due to the inherently poor heat transfer coefficient in such a system (oil-to-metal) and the tendency for the medium to become viscous (the product in most cases is a quite viscous cement-like solution of polymer) during the course of the reaction, reaction times of from 10 to 20 hours are much more easily controlled in commercial scale, batch-type equipment.

The relative proportions of solvent or diluent and monomer may also vary quite widely, although because of the aforementioned viscosity increase during polymerization the proportion of monomer will usually be less than that of the solvent or diluent. It is generally desirable to employ a solvent:monomer (volume) ratio of from about 5:1 to about 30:1 or more, most preferably from about 7:1 to 15:1. With such systems, and when producing diene polymers of molecular weight above about 50,000 operation at final solids levels of from about 5 to about 10 percent is practical.

The monomers which are polymerized according to this invention are hydrocarbon in nature and constitute the class of conjugated polyolefin hydrocarbons. In the process of this invention such monomers are not only converted to polymers having new and improved properties by reason of their containing essentially all of the units derived from conjugated polyolefin hydrocarbons present in a desired geometric isomeric configuration, for example in an all 1,4 structure, and in a desired stereo isomeric configuration, for example cis-1,4 or trans-1,4, but also by reason of their being possessed of markedly higher molecular weights and/or lower gel contents, as compared to analogous polymers prepared in the absence of the organo-silicon modifier.

The monomeric hydrocarbon material which is polymerized according to this invention may be a single conjugated polyolefin hydrocarbon or it may be a mixture of any two or more of such conjugated polyolefin hydrocarbons, or it may be mixture containing a significant proportion of a conjugated hydrocarbon together with one or more other polymerizable hydocarbons including both monoolefin hydrocarbons and non-conjugated polyolefin hydrocarbons. A surprising feature of the heavy metal/organometallic catalysts is their ability to combine dissimilar monomeric units with each unit responding in its own unique fashion to the directive influence of the catalyst. Thus for example, butadiene-1,3 hydrocarbons polymerized with a 1,4 active catalyst will be found to be present in copolymers as 1,4 units irrespective of the presence or absence of other monomers, even when the latter are monoolefinic hydrocarbons.

The conjugated polyolefin hydrocarbon preferably is a conjugated diolefin hydrocarbon such as butadiene (the simplest of the series) or a methyl-substituted butadiene-1,3, that is, isoprene or piperylene; or it may be a conjugated aliphatic diolefin containing more than five carbon atoms containing not more than one hydrocarbon substituent and that attached to the 2-carbon atom including 2-ethyl-butadiene-1,3, 2-propyl-butadiene-1,3, 2-phenyl-butadiene-1,3, 2-neopentyl-butadiene-1,3 and many others. In addition other monomeric conjugated polyolefin hydrocarbons which may be polymerized include hexadiene-2,4, hexatriene-1,3,5, myrcene, alloocimine and others. Conjugated alicyclic polyolefin hydrocarbons such as cyclopentadiene, cyclohexadiene-1,3, dimethylfulvene, and the like, or an aryl-substituted polyolefin such as diphenyl fulvene, and the like. Mixtures of any two or more of such conjugated polyolefins may be employed.

When the monomeric hydrocarbon material is a mixture of a conjugated polyolefin hydrocarbon, preferably a conjugated diolefin, with another type of hydrocarbon monomer, the other hydrocarbon may be an aliphatic monoolefin such as ethylene, propylene, butene-1, isobutene, or any of the various pentenes, hexenes, octenes, decenes, etc. whether straight-chained or branched, or it may be an alicyclic monoolefin such as cyclohexene, cycloheptene, and the like, or it may be an aryl-substituted monoolefin such as styrene, alpha-methyl styrene, o-, m- and p-methyl styrenes, dimethyl styrenes, indene, vinyl naphthalene, allyl benzene, and many others. In addition the monomeric material may be a mixture of a conjugated polyolefin with a non-conjugated polyolefin such as allene, diallyl, dimethallyl, propyl allene, squalene, 1-vinyl-cyclohexene-3, divinyl benzene and others. Greatly preferred are the butadienes-1,3 hydrocarbons containing not more than one substituent and that on the 2-carbon atom.

The invention will now be more fully described with reference to several specific examples which are intended as being illustrative only.

*Example I*

In this example isoprene is homopolymerized in benzene employing a catalyst prepared by interaction of $TiCl_4$ and triisobutyl aluminum in the presence of a silicone stop cock grease of the type commonly utilized to seal the joints of laboratory glassware. The polymer to be obtained is an essentially all-cis 1,4 polyisoprene of materially increased molecular weight as compared with a control polyisoprene concurrently prepared in the same fashion but without the silicone ingredient. The experiments are conducted in 1 quart glass beverage bottles which first are washed clean, dried in a high temperature air oven and allowed to cool under a current of dry, oxygen-free nitrogen. In charging the bottles the nitrogen flow is continued at all times until the bottle is sealed. First, the benzene (440 grams or 500 ml.) and isoprene (39.5 grams) are combined. Then the triisobutyl aluminum (0.92 ml. or about 6.5 millimoles per liter of charge) is added followed by a piece of silicone laboratory stop cock grease of about 0.2 gram and the bottle contents agitated until the grease dissolves. Finally, 0.36 ml. of $TiCl_4$ are added and the bottle swirled to effect mixing. At this point the Ti/Al ratio is 0.9:1 with a titanium concentration of 5.85 millimoles per liter (mM./liter). The catalyst rapidly forms in the form of a dark, brownish black precipitate. The bottle is then sealed and placed in a rack rotating end-over-end in a 5° C. water bath. A control, prepared in the same fashion but without the silicone, is charged at the same time.

No sign of polymerization is noted in the silicone-containing bottle until after about 8 hours whereas the control bottle shows a vigorous reaction after about one hour. At the end of about 70 hours the reactions are adjudged to have gone as far as they will go. The contents of both bottles then are observed to have substantially thickened and both are seen to contain viscous cement-like solutions of polymer, the control being so thick as to be scarcely able to flow. At this point the bottles are removed from the bath, flushed with dry nitrogen and a mixture of (1) 2 ml. of concentrated (30%) $NH_4OH$, (2) 20 ml. of methanol and (3) 60 ml. of benzene is injected into each bottle to kill the catalyst. After the mixture has been agitated to disperse the "shortstop" solution somewhat, 5 ml. of an antioxidant dispersion containing 8 grams of "Agerite White" (sym-di-beta-naphthyl-para-phenylenediamine), 4 grams of "VDH" (diphenyl-para-phenylenediamine), and 200 ml. of benzene are added. The bottles are then resealed and placed back in the water bath for both added solutions to disperse themselves. The polymer cements are noticeably thinned by this treatment and the bottle contents can be discharged into a closed vessel each containing 400 ml. of a 3:1 (by volume) mixture of benzene and methanol. A thin, homogeneous solution results in each case to which a small proportion of pure methanol is added to cause precipitation of the polymer as fine crumbs. The latter are filtered off and kneaded in pure methanol to extract residual benzene, meanwhile adding an additional 5 ml. of the above-mentioned antioxidant dispersion and kneading it into the polymer. The polymer is then sheeted with several passes through a mill and dried at 50° C. in a vacuum oven.

The resulting polymers are then subjected to a sol-gel determination with the following results:

| Sample | Conversion at 70 hrs., percent | Percent Gel | Swelling Index | Intrinsic Viscosity |
|---|---|---|---|---|
| Silicone-modified | 57 | 7 | 97 | 5.55 |
| Control | 97 | 10 | 66 | 3.82 |

Infrared examination of the two samples employing the method of R. R. Hampton (Analytical Chemistry, August 1949, page 923) reveals that both samples are all-cis 1,4 polyisoprenes (i.e. at least 95% cis 1,4 units) with substantially no units derived from 1,2 or 3,4 addition. In the above sol-gel data it is clear that the silicone stop cock grease materially modified the course of the polymerization in the experimental bottle charge. The increase in I.V. from 3.82 to 5.55 is a marked improvement to be derived from the addition of such a small amount (0.5%) of the modifier. While the reduction of the gel content from 10 to 7% is a difference within the limits of experimental error, subsequent experiments will demonstrate quite consistently that the gel content of the polymer is generally lower and that such an effect is more noticeable in solvents which produce more highly gelled polymers.

While it will be noted that the silicone stop cock grease retarded the polymerization, subsequent examples will show that this retarding action can be partially overcome by the use of increased catalyst levels. The important feature of the data of Example I is that a marked increase in molecular weight can be obtained without a corresponding increase in gel content.

The silicone-modified polymer of Example I is found to mill just as easily as the control polymer. This is as expected since the gel content is lower. When vulcanized the silicone-modified polymer has excellent properties.

*Example II*

The procedure of Example I is repeated several times employing in one case 0.5 percent of stop cock grease and in another 0.5 percent of a methyl silicone oil (Dow-Corning DC 200 Silicone Oil). The reactions are carried out at 5° C. and the polymers are worked up as in Example I. Sol-gel data on the resulting polymers are as follows:

| Percent Modifier | Conversion at 116 hrs., percent | Percent Gel | Swelling Index | Intrinsic Viscosity |
|---|---|---|---|---|
| grease, 0.5% | 40 | 12 | 92 | 5.33 |
| oil, 0.5% | 32 | 17 | 83 | 5.60 |

In a comparable run, 0.5 percent of the same silicone grease is added as the last component of the charge (after preparation of the catalyst and addition of monomer) the reaction is much faster and the intrinsic viscosity is only 3.34.

*Example III*

As pointed out in Example I, the reaction times of 70 hours (Ex. I) or 116 hr. (Ex. II) are too slow for commercial utility. In this example, the procedure of Example I is repeated a number of times employing a level of triisobutyl aluminum of 7.75 mM./liter and a TiCl₄ level of 7.0 mM./liter (Ti/Al=0.9 : 1). At the same time, varying amounts of the methyl silicone oil of Example II are included to determine whether an optimum exists. In this case much higher conversions are reached in only 46 hours. Sol-gel data are as follows:

| Silicone Oil, Wt. Percent on Monomer | Time, Hrs. | Conversion, percent | Percent Gel | Swelling Index | Intrinsic Viscosity |
|---|---|---|---|---|---|
| 0.00 | 46 | 96 | 14 | 119 | 3.51 |
| 0.11 | 46 | 80 | 11 | 162 | 4.18 |
| 0.22 | 46 | 61 | 13 | 102 | 5.20 |
| 0.44 | 46 | 36 | 16 | 100 | 5.20 |
| 1.03 | 46 | 12 | 20 | 79 | 5.00 |

It is evident that from about 0.1 to about 1.1 percent silicone oil has a pronounced effect on the molecular weight of the polymer. It is also evident that from about 0.1 to 0.4 percent better reaction rates and maximum I.V. are obtained. With as little as 0.1 to 0.25 percent, 60 to 80 percent conversion are obtained with maximum gain in molecular weight.

*Example IV*

The procedure of Example III is repeated but at a temperature of 50° C. instead of 5° C. The control made without the silicone oil proceeds to an I.V. of only 2.26 while with 0.1 to 0.4 percent of the silicone oil the I.V. is about 2.50 in all cases. While the effect of temperature is strong, it evidently does not completely overcome the molecular weight building ability of the silicone oil.

*Example V*

The procedure of Examples III and IV is repeated except that "pure grade" dried butane is substituted for the benzene solvent, and the triisobutyl aluminum concentration is 7.75 mM./liter while maintaining the molar ratio Ti/Al at 0.9 : 1. The polymers are worked up as in Example I and the following sol-gel data determined on the dried polymers.

| Percent Silicone Oil | Time, Hrs. | Percent Conversion | Percent Gel | Swelling Index | Intrinsic Viscosity |
|---|---|---|---|---|---|
| 0.00 | 22 | 100 | 40 | 32 | 3.43 |
| 0.22 | 22 | 59 | 20 | 88 | 4.28 |
| 0.44 | 22 | 23 | 18 | 92 | 4.09 |

It is evident that butane produces a more highly gelled polymer than does benzene. However, this tendency is shown to be overcome to a large degree by the addition of silicone oil. In addition, a valuable increase in molecular weight is achieved. In all cases, the polymers obtained are all-cis 1,4 polyisoprenes.

It should be noted, that to achieve an I.V. of over 4 (i.e. without silicone) in the butane system it is necessary to carry out the polymerization at temperatures as low as −20° C. and to utilize the purest grades of butane and isoprene in order to achieve a practical reaction rate. Even so, such a reaction requires 89 hours to reach a conversion of over 80 percent and the polymer obtained will contain 25 percent gel or more. It is clear that the use of silicone oil in butane at 5° C. is a better mode of operation when a high molecular weight, low-gel polymer is desired.

*Example VI*

In this example, tetra-ethyl silicate and diphenyl silanediol are utilized as the organo-silicon modifiers at levels of 0.1 percent and 0.2 percent by weight on the monomeric isoprene. The solvent is benzene, the TiCl₄ level is 7.0 mM./liter, the Ti/Al ratio is 0.9:1, and the reaction is conducted for 17.8 hours at 5° C. The polymer cements are treated in each case with a solution containing 5 ml. of triethylamine, 20 ml. of methanol, and 80 ml. of benzene and then worked up as in Example I. The data on these polymers are as follows:

| Additive | Wt. Percent on Monomer | Percent Conversion | Percent Gel | Swelling Index | Intrinsic Viscosity |
|---|---|---|---|---|---|
| None | | 95 | 8 | 158 | 2.70 |
| Tetra-ethyl silicate | 0.1 | 92 | 14 | 127 | 3.69 |
| Do | 0.2 | 65 | 15 | 118 | 4.16 |
| Diphenyl silanediol | 0.1 | 96 | 13 | 170 | 3.06 |
| Do | 0.2 | 92 | 6 | 206 | 2.95 |

While the I.V. of all the polymers are somewhat low, both tetra-ethyl silicate and diphenyl silanediol seem to have less effect on reaction rate while favoring increased molecular weights.

From the experiments described in Examples I to VI, it is seen that the effect of an organo-silicon compound enables one to duplicate the effects of low temperature reactions without the use of expensive, extra-low temperature refrigeration equipment.

While we have disclosed certain preferred manners of performing an invention, we do not desire or intend to limit ourselves solely thereto, for the precise proportions of the materials utilized may be varied and equivalent chemical materials may be employed, without departing from the spirit and scope of the invention as defined in the appended claims.

We claim:

1. The method of polymerizing monomeric isoprene to obtain an essentially all 1,4 polymer comprising combining said monomeric isoprene with a reaction medium containing an inert hydrocarbon diluent and from about 0.5 to about 7%/wt. of a catalyst prepared by combining (1) a trialkyl aluminum, (2) from about 0.1 to about 0.5% by weight on said isoprene of a methyl silicone oil, and (3) titanium tetra-chloride, said ingredients (1) and (3) being combined in a molar ratio Ti:Al of between about 0.5:1 to about 1.5:1, and carrying out the polymerization of said isoprene in said medium at a temperature between about —5° and about 25° C.

2. The method of claim 1 wherein tetraethyl silicate is substituted for said silicone oil.

3. The method of claim 1 wherein diphenyl silanediol is substituted for said silicone oil.

4. The method of polymerizing a monomeric material selected from the class consisting of butadiene-1,3, isoprene, piperylene, 2-ethyl-butadiene-1,3, 2-propyl-butadiene-1,3, 2-phenyl-butadiene-1,3, and 2-neopentyl-butadiene-1,3, comprising combining said monomeric material with a reaction mixture containing an inert hydrocarbon diluent and from about 0.5 to about 7%/wt. based on said monomeric material of an active catalyst prepared by combining (1) an aluminum alkyl and (2) a compound of a heavy metal selected from the class consisting of titanium, vanadium, cobalt and nickel, the ratio of said heavy metal: aluminum in said catalyst being, when titanium is the heavy metal, from about 0.5:1 to 3:1, when vanadium, from about 1:1 to about 1:20, when cobalt, from about 25:1 to about 1:25, and when nickel, from about 10:1 to about 1:10, with (3) from 0.1 to 1.1%/wt. based on the weight of said monomeric material of an organosilicon modifier soluble in said mixture and selected from the class consisting of silicone greases, methyl silicone oils, tetraethyl silicate, and diphenyl silane diol, and carrying out the polymerization of said monomeric material in said reaction mixture at a temperature from about —5° to about 35° C.

References Cited in the file of this patent

UNITED STATES PATENTS

| | | |
|---|---|---|
| 2,154,079 | Weiss | Apr. 11, 1939 |
| 2,441,214 | Thomas et al. | May 11, 1948 |
| 2,692,887 | Berry | Oct. 26, 1954 |
| 2,699,457 | Ziegler et al. | Jan. 11, 1955 |
| 2,721,189 | Anderson et al. | Oct. 18, 1955 |
| 2,827,447 | Nowlin et al. | Mar. 18, 1958 |

FOREIGN PATENTS

| | | |
|---|---|---|
| 533,362 | Belgium | May 16, 1955 |
| 538,782 | Belgium | Dec. 6, 1955 |